Sept. 23, 1969   J. J. RILEY   3,469,060
CONTACT SYNCHRONIZING WELDING CIRCUIT
Filed March 22, 1967
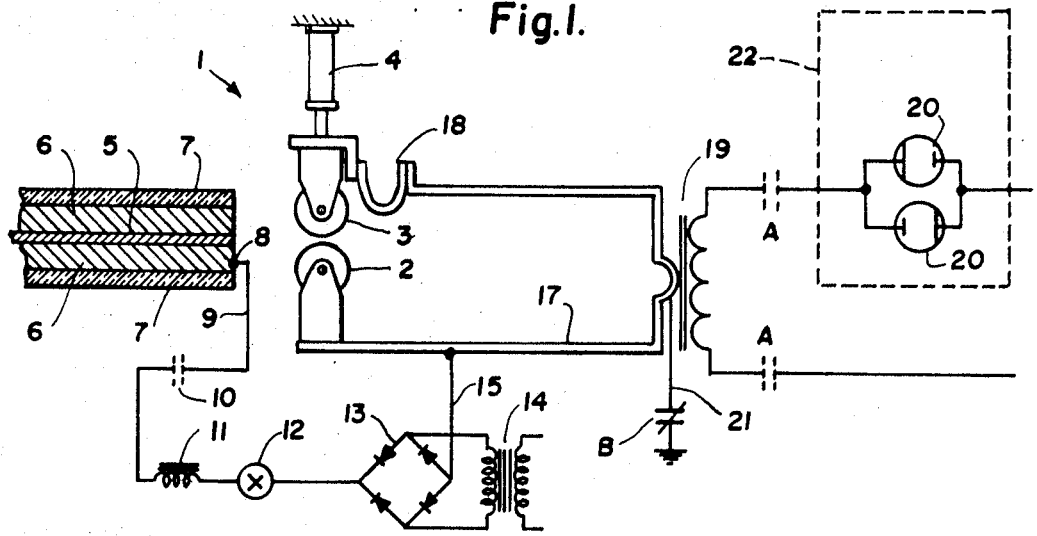
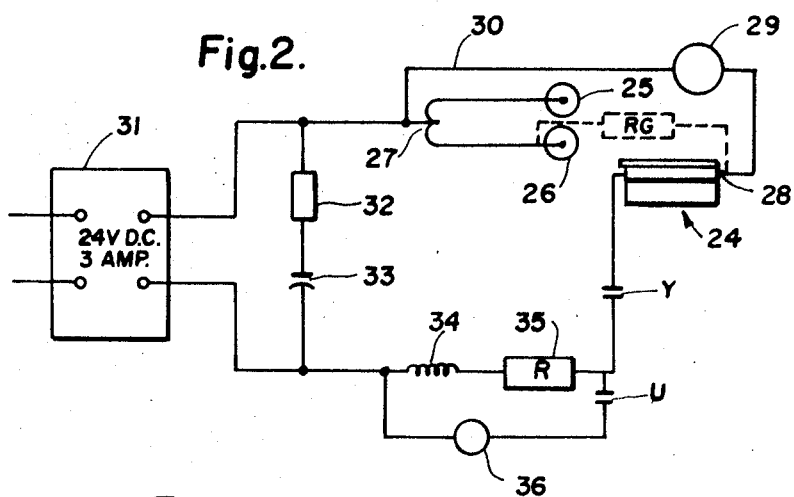
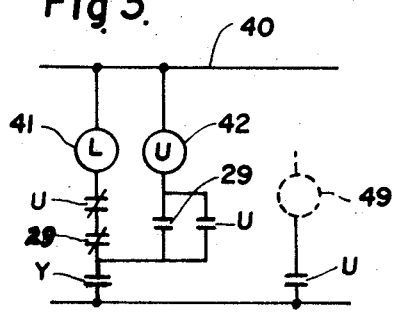
INVENTOR.
JOSEPH J. RILEY
BY
*William J. Ruano*
ATTORNEY

United States Patent Office 3,469,060
Patented Sept. 23, 1969

3,469,060
CONTACT SYNCHRONIZING WELDING CIRCUIT
Joseph J. Riley, Warren, Ohio, assignor to The Taylor-Winfield Corporation, Warren, Ohio
Filed Mar. 22, 1967, Ser. No. 625,085
Int. Cl. B23k 11/06
U.S. Cl. 219—82          9 Claims

ABSTRACT OF THE DISCLOSURE

A welding apparatus and control circuit for the welding of metal strips wherein there is provided insulated clamps for holding the strips and a control circuit for controlling the application of the welding current to the strips when the electrodes have made contact with the strips. Upslope and downslope control are also provided to minimize strip edge deformation.

---

This invention relates to a contact synchronizing circuit for a seam welder to enable the joining of metal strips end-to-end without undesirable markings of the welding wheels and strips.

An outstanding disadvantage of commonly used strip joining seam welders is that the welding current is turned on prior to the time the copper wheel electrodes make initial contact with the steel strip being processed, which electrodes have to separate as they climb onto the strip. This separation causes an arc which marks the wheels as well as the strip. The wheel marks must be eventually removed since an accumulation of them would seriously affect the quality of the weld. Additionally the arcing obviously causes more maintenance and shortens the life of the electrodes. Marking of the strip would detract from its quality and that of the weld.

An object of the present invention is to provide a novel welding control circuit or system which overcomes the above named disadvantages and which uses the contacting of the welding wheels with the steel strip to be welded as a signal or control to initiate the flow of welding current.

Another object of the invention is to provide means in the aforesaid novel welding control system to prevent the possibility of a false signal or control impulse from small metallic chips or metal dust which might bridge the insulation of the clamp or moving welding wheel assembly.

Still another object of the invention is to provide operator safety in case of welding transformer insulation failure even though using insulated clamps.

Other objects and advantages will become more apparent from a study of the following description taken with the accompanying drawing wherein:

FIG. 1 is a schematic, electrical diagram of the contact synchronizing welding circuit embodying the present invention; and, FIGS. 2 and 3 show modifications of the circuit for minimizing or preventing false signals or faulty operation.

Referring more particularly to FIG. 1 of the drawing, numeral 1 generally denotes a strip joining seam welder for welding metal strips or sheets, such as 5, in end-to-end relationship, while held tightly clamped between clamp 6, 6, in a tinning line or other processing line. Clamp 6, 6 is insulated from its supporting structure and from ground by insulators 7, 7. Welding electrode wheels 2 and 3, of copper or other suitable electrical conducting material, are connected through heavy conductor 17 and springy conductor 18 to the secondary winding of welding transformer 19, the midpoint of which winding is grounded by a conductor 21 connected through contactor B to ground. Electrode wheel 3 may be lowered under pressure by air cylinder 4 or the like.

The primary winding of welding transformer 19 is energized by a suitable source of A.C. voltage (not shown) controlled by a suitable control circuit, illustrated by block diagram 21 and including ignitrons 20.

An important feature of the present invention is the provision of an electrical control circuit which causes welding current flow to be initiated in response to the climbing of the wheel electrodes 2, 3 onto strip 5. To do this, it is necessary that the secondary circuit of welding transformer 19 be insulated from ground, and also that the welder clamp 6, 6 be insulated from ground. At the moment the wheels 2, 3 touch the strip 5, relay 12 is energized, which is a D.C. relay coil preferably of about 24 volts. This circuit is energized by an A.C. source connected to transformer 14, which is rectified by rectifier 13, passing D.C. current through relay coil 12, choke 11, contactor 10, conductor 9, connection 8 to clamp 6, strip 5, wheel electrodes 2, 3, conductors 17 and 15. The relay stays energized until the moved wheels leave the strip at the other edge. Choke 11 minimizes the effect of the A.C. voltage when welding, on performance of relay 12. The contactor 10 is provided to interrupt the circuit so that the 24 volts can be removed from the clamp when the strip is running through the line to avoid any possibility of marking the strip by arcing even though the current magnitude is in the milliampere range.

The contacts of relay 12 initiate the welding control 22. The welding current flow is controlled by ignitrons 20, 20 connecting the welder transformer 19 to the power primary line.

In the interest of safety to the welding machine operator, it is normal procedure to ground the midpoint of the secondary winding as shown through conductor 21. Secondary voltage is low, generally below 20 volts. However, with the secondary or welding circuit insulated from ground, there is always the possibility of the primary voltage appearing on the secondary side if the insulation within the welding transformer fails. It is to avoid this condition that the secondary winding is tied to ground so that the primary voltage cannot appear in the secondary and thereby be hazardous to the operator. Unfortunately, when using the initiation circuit as described, the secondary cannot be permanently connected to ground. While the welding cycle is taking place, the ground connection must be broken. This is the reason for normally closed contactor B. Contactor B is energized just prior to the start of the actual welding cycle and is de-energized as soon as the cycle is over.

Another method of obtaining the safety feature is not to ground the secondary but to use a primary isolating contactor A. In this case the voltage is removed from the primary winding at all times except when actually welding. Contactor A would operate the same as previously described contactor B. Contactor A is an isolating type, that is, its contacts do not open or close when current is passing but close immediately prior to current flow, and then open immediately after being signaled by limit switches (or similar devices) operated by the welding carriage during the welding stroke. Actual control of the welding current is through the welding control ignitrons 20. This makes it possible to use a contactor of smaller rating, such as 300 amps, even though the primary current may exceed 1500 amps.

The initiation circuit as described minimizes the electrode wheel marking (from arcing). However, there is still a tendency to arc if the full level of welding current is used initially. Therefore, it is advisable to equip the welding control with an accessory control, called upslope control. Upslope control causes the welding current to start at a predetermined low value and increase with time to the necessary level. This time of increase is in the range of .1 to .2 of a second. Thus while the weld wheels 2, 3 are seating on the strip 5, the current is being gradually increased. The effect of using upslope control minimizes the strip edge deformation or extrusion of the metal past the edge of the strip.

After progressing along the weld and when the wheels 2, 3 start to fall off the strip 5, there is a greater degree of deformation near the edge as the cooling effect of the surrounding metal continually decreases as the edge is approached. The degree of deformation can be minimized by using a control which does the reverse of upslope control. This is called downslope control and effectively decreases the current value with time. The downslope control must be initiated while the weld wheels are on the strip. It can be initiated from a time base; that is being timed from the instant the afore-mentioned initiation circuit closes at the beginning of the weld. A second possibility is to have a photocell or similar device (not shown) mounted on the welding carriage and spaced an inch or so ahead of the weld wheel centerlines. As the edge of the strip is approached, the photocell would signal and start the downslope control. In other words, the starting signal is sensed from strip position rather than time.

Welders of this type are often equipped with swaging rolls which function to reduce the weld thickness by applying a swaging force on the hot weld immediately after it is welded. The swaging rolls must be in contact prior to climbing on the strip to be effective. However with thin sheets (.005 to .015 inch) there is a distinct tendency for the rolls to crumple the strip edge while trying to climb on the strip. This problem can be eliminated by applying a light pressure while the rolls are climbing onto the strip, and immediately increase the pressure as soon as the rolls are on the strip. This can be accomplished by using a double pressure system. In essence, fluid, air or oil, is introduced into both the active side and the bucking side of the piston. The respective pressures are adjusted so there is a resultant downward force on the swaging rolls to keep them in contact. When the force is to be increased suddenly when the rolls are on the strip, it is accomplished by exhausting the fluid on the bucking side of the piston. This allows rapid pressure buildup such as required in this type of application.

The initiation circuit would be a duplicate of that shown in FIG. 1 for welding except one side (conductor 15) would be connected to the insulated mounting of the swaging rolls instead of to the secondary.

FIG. 2 shows a modification of the circuit shown in FIG. 1 wherein terminal board 31 provides a 24 volt D.C. source (about 3 amps) across the voltage transient suppressing circuit comprising about 100 ohm resistor 32 and μfd. condenser 33. The D.C. voltage is connected by conductor 27 to welding electrode wheels 25, 26. A parallel circuit extends through conductor 30, relay 29, connection 28, clamp 24, contactor Y, resistor 35 and choke 34, the latter two being bridged by contactor U and relay 36 (corresponding to relay 12 of FIG. 1). As in FIG. 1, the wheels 25, 26 are moved between two confronting pairs of insulated clamps of the construction shown in FIG. 1 and the wheels climp on the steel strip being welded. In FIG. 1, the D.C. current going through the circuit is low—about 50 milliamperes. The coil resistance of relay 12 is about 350 ohms. In practice, while the clamp 24 or moving weld wheel 25, 26 assembly are well insulated from each other as far as machine construction is concerned, there is always the possibility that small metallic chips, metal dust, etc, will bridge the insulation. This forms a "high" resistance ground—say 300 to 50 ohms in magnitude. At this typical resistance value, indicated in FIG. 2 as $R_G$, approaches or becomes less than the coil resistance of relay 36, it tends to generate a false signal indication in that relay 36 energizes as soon as contact Y closes rather than when the weld wheels 25, 26 touch the steel strip.

To minimize the possibility of false signal, the D.C. current level is raised to approximately 3 amps at the time of strip contact. Now if a "high" resistance ground forms, the circuit current will be very low and not develop enough voltage drop across the choke 34 and resistance 35 (about 8 ohms total) to energize relay 36 which is shunting them. However, when the wheels 25, 26 touch the strip, the current will raise to 3 amps and relay 36, being a 24 volt relay, will energize.

Relay 29 (another relay like low current, 24 volt D.C. relay 12) is put in circuit to indicate if the "high" resistance ground is too low in resistance to have equipment function properly. When relay contact Y is closed, relay 29 will also be energized if the ground resistance is over 50 ohms. Relays 29 contact energizes relay U which locks in and sets up the circuit for relay 36 (weld heat) to energize when the wheels 25, 26 contact the strip.

If relay 29 will not energize because ground resistance is too low, a ground indication lamp 41 lights (see FIG. 3) indicating the condition, and effectively stops the machine sequence as relay U will not energize to continue the machine sequence. In FIG. 3, contacts 29' are part of relay 29 of FIG. 2.

Thus it will be seen that I have provided an efficient welding control circuit that minimizes or prevents the deleterious effects of the A.C. welding voltage on the welding strip or that of the control circuit and which is substantially fool-proof and not susceptible to faulty operation, such as from the presence of metal particles or dust bridging the clamp insulation.

While I have illustrated and described several embodiments of my invention, it will be understood that this is by way of illustration only, and that various changes and modifications may be made within the contemplation of my invention and within the scope of the following claims.

I claim:

1. A welding circuit for welding metal strips in end-to-end relationship comprising a welding transformer including a primary winding energized by a source of alternating current potential, a welding control circuit for controlling the flow of welding current to said primary winding, and including a secondary winding insulated from ground in a loop circuit with a pair of confronting, spaced welding electrode wheels adapted to be moved along the end portions of strips to be welded together, a clamp for clamping ends of the meal strips while being welded, said clamp including insulating means on its outer faces for insulating the clamp from ground, control circuit means energized by a D.C. source and including a series circuit comprising part of said loop circuit and said electrode wheels, a relay having contacts in said welding control circuit, and said clamp and clamped strip for interrupting said welding control circuit and the energization of said primary winding by said alternating current potential as a direct consequence of disengagement of said electrode wheels from said strip which interrupts current flow through said loop circuit.

2. A welding circuit as recited in claim 1 together with a grounded conductor connected to the midpoint of said secondary winding, and a normally closed contactor included in said grounded conductor which is opened only during the welding cycle.

3. A welding circuit as recited in claim 1 together with an isolation contactor in series with said primary winding in lieu of said grounded conductor and normally closed contactor.

4. A welding circuit as recited in claim 1 together with an upslope control for starting the welding current at a predetermined low value and increasing after a predetermined time period to minimize strip edge deformation or extrusion of the metal past the edge of the strip.

5. A welding circuit as recited in claim 1 together with a downslope control for decreasing the welding current just before said electrode wheels fall off said strip to minimize deformation near the edge of the strip.

6. A welding circuit as recited in claim 1 together with means for applying a limited swaging force to the weld while hot as said electrode wheels climb the strip, and fluid pressure means for thereafter increasing said swaging force.

7. A welding circuit as recited in claim 1 together with a serially connected choke and resistor shunting said relay.

8. A welding circuit as recited in claim 7 together with a second relay and its contacts in series with said control circuit for setting up the circuit of said first mentioned relay if the resistance between said wheels and ground exceeds a predetermined value.

9. A welding circuit as recited in claim 8 together with a ground indication lamp connected in said control circuit so as to light when said resistance is below said predetermined value.

References Cited

UNITED STATES PATENTS

| 1,932,119 | 10/1933 | Reed | 219—108 |
| 2,634,353 | 4/1953 | Geiszler et al. | 219—82 |
| 2,261,694 | 11/1941 | Meenen | 219—81 |

JOSEPH V. TRUHE, Primary Examiner

B. A. STEIN, Assistant Examiner

U.S. Cl. X.R.

219—110, 108